United States Patent
Harada

(10) Patent No.: US 10,697,427 B2
(45) Date of Patent: Jun. 30, 2020

(54) VORTEX GENERATOR AND WIND TURBINE BLADE ASSEMBLY

(71) Applicant: MITSUBISHI HEAVY INDUSTRIES, LTD., Tokyo (JP)

(72) Inventor: Motoshi Harada, Tokyo (JP)

(73) Assignee: MITSUBISHI HEAVY INDUSTRIES, LTD., Minato-Ku, Tokyo (JP)

( * ) Notice: Subject to any disclaimer, the term of this patent is extended or adjusted under 35 U.S.C. 154(b) by 136 days.

(21) Appl. No.: 16/006,166

(22) Filed: Jun. 12, 2018

(65) Prior Publication Data

US 2019/0003451 A1  Jan. 3, 2019

(30) Foreign Application Priority Data

Jun. 30, 2017  (JP) .................. 2017-129862

(51) Int. Cl.
*F03D 1/06* (2006.01)

(52) U.S. Cl.
CPC ......... *F03D 1/0675* (2013.01); *F03D 1/0633* (2013.01); *F03D 1/0641* (2013.01); *F03D 1/0683* (2013.01); *F05B 2240/122* (2013.01); *F05B 2240/301* (2013.01)

(58) Field of Classification Search
None
See application file for complete search history.

(56) References Cited

U.S. PATENT DOCUMENTS

| | | | |
|---|---|---|---|
| 9,140,233 B2 * | 9/2015 | Watts | F03D 1/0633 |
| 10,443,562 B2 * | 10/2019 | Corten | B64C 23/06 |
| 2014/0219810 A1 | 8/2014 | Wuerth et al. | |
| 2015/0361952 A1 | 12/2015 | Petsche et al. | |
| 2017/0138339 A1 | 5/2017 | Fukami | |

FOREIGN PATENT DOCUMENTS

| | | |
|---|---|---|
| DE | 102013201871 A1 | 8/2014 |
| DE | 102013210733 A1 | 12/2014 |
| EP | 2484898 A1 | 8/2012 |
| EP | 2548801 A1 | 1/2013 |
| EP | 2824320 A1 | 1/2015 |
| EP | 2739529 B1 | 9/2015 |
| EP | 3168459 A1 | 5/2017 |
| JP | 6153989 B2 | 6/2017 |
| WO | 2006/122547 A1 | 11/2006 |
| WO | 2013/014015 A2 | 1/2013 |
| WO | 2013014082 A2 | 1/2013 |
| WO | 2014/198353 A1 | 12/2014 |
| WO | 2015/030573 A1 | 3/2015 |

OTHER PUBLICATIONS

Petsche et al, DE 10 2013 210733 (machine translation), published Dec. 11, 2014, (Year: 2014).*
Europe Patent Office, "Search Report for European Patent Application No. 18179686.3," dated Nov. 20, 2018.

* cited by examiner

*Primary Examiner* — Woody A Lee, Jr.
*Assistant Examiner* — Jason G Davis
(74) *Attorney, Agent, or Firm* — Manabu Kanesaka; Benjamin Hauptman; Kenneth Berner

(57) ABSTRACT

A vortex generator for a wind turbine blade includes at least one fin including a suction surface and a pressure surface. Each of the at least one fin is configured such that, in at least a part of a height range of the fin, a maximum camber ratio cmax/C being a ratio of a maximum camber cmax to a fin chord length C decreases with distance from a root of the fin toward a tip portion of the fin.

15 Claims, 7 Drawing Sheets

WIND INFLOW DIRECTION

BLADE SPANWISE DIRECTION

BLADE SPANWISE DIRECTION

FIN CHORDWISE DIRECTION

VORTEX GENERATOR AND WIND TURBINE BLADE ASSEMBLY

RELATED APPLICATIONS

The present application is based on, and claims priority from, Japanese Application No. JP2017-129862 filed Jun. 30, 2017, the disclosure of which is hereby incorporated by reference herein in its entirety.

TECHNICAL FIELD

The present disclosure relates to a vortex generator and a wind turbine blade assembly.

BACKGROUND ART

Approaches to improve aerodynamic performance of a wind turbine blade have been sought for some time to improve operation efficiency of a wind turbine. In one of the approaches, a vortex generator is disposed on a surface of a wind turbine blade to suppress separation of a flow along the surface of the wind turbine blade.

Patent Documents 1 to 9 disclose a vortex generator having a platform portion to be mounted to a surface of a wind turbine blade, and a fin disposed upright on the platform portion.

CITATION LIST

Patent Literature

Patent Document 1: EP2484898A
Patent Document 2: WO2015/030573A
Patent Document 3: DE102013201871A
Patent Document 4: WO2014/198353A
Patent Document 5: EP2824320A
Patent Document 6: WO2006/122547A
Patent Document 7: US2014/0219810A
Patent Document 8: EP2548801A
Patent Document 9: WO2013/014015A

SUMMARY

However, demand for improvement of the aerodynamic force of wind turbine blades is recently increasing, and thus further enhancement of the separation suppressing effect of the vortex generators disclosed in Patent Documents 1 to 9 is desired.

An object of at least some embodiments of the present invention is to provide a vortex generator and a wind turbine blade assembly including the same, whereby it is possible to achieve an improved separation suppressing effect.

(1) A vortex generator for a wind turbine blade according to some embodiments of the present invention includes at least one fin including a suction surface and a pressure surface. Each of the at least one fin is configured such that, in at least a part of a height range of the fin, a maximum camber ratio cmax/C being a ratio of a maximum camber cmax to a fin chord length C decreases with distance from a root of the fin toward a tip portion of the fin.

A vortex generator produces a longitudinal vortex with a lift generated by a fin, to promote momentum exchange inside and outside a boundary layer at a wake side of the vortex generator and to reduce the thickness of a boundary layer, thereby suppressing separation at a trailing edge side of a wind turbine blade. Thus, to enhance the separation suppressing effect of the vortex generator, it is desirable to use a fin airfoil having a camber, to increase a lift that is generated by the fin and form longitudinal vortices effectively. However, the present inventors found that, in the course of their research and development of a vortex generator having a fin airfoil with a camber, the separation suppressing effect of the vortex generator cannot be achieved sufficiently if the camber is relatively large in the vicinity of the tip portion of the fin, on the contrary to expectation. This is due to occurrence of a flow (crossflow) flowing from a fin root side, where the pressure is relatively high, to a fin tip portion side, where the pressure is relatively low, caused by a pressure gradient in the fin height direction on the suction surface side, as a result of a pressure decrease on the suction surface at the fin tip portion side, in a case where the maximum camber is large at the fin tip portion side. This crossflow is a flow in a direction opposite to that of longitudinal vortices described above, and thus impairs generation of longitudinal vortices, which may prevent achievement of a sufficient separation suppressing effect by the vortex generator.

In this regard, with the above configuration (1), in at least a part of the height range of the fin, the maximum camber ratio cmax/C being a ratio of the maximum camber cmax to the fin chord length C decreases with distance from the root of the fin toward the tip portion of the fin, and thus it is possible to suppress a pressure decrease on the suction surface side at the fin tip portion side, and to suppress occurrence of a crossflow, which may impair generation of longitudinal vortices. As a result, it is possible to enhance the separation suppressing effect of the vortex generator.

(2) In some embodiments, in the above configuration (1), each of the at least one fin is configured such that, provided that H is a height of the fin, in at least a part of the height range of not less than 0.5 H, the maximum camber ratio cmax/C monotonically decreases with distance from the root toward the tip portion.

From the root to the vicinity of the center of the fin, it is desirable to set an optimum maximum camber ratio corresponding to the Reynolds number, in order to obtain a sufficient lift that is required for generation of longitudinal vortices. On the other hand, toward the tip portion of the fin, it is desirable to reduce the maximum camber ratio, in order to suppress a pressure decrease on the side of the suction surface in the vicinity of the tip portion of the fin, as described above. In this regard, with the above configuration (2), at least in a part of the height range of not less than 0.5 H, which is the center of the fin, the maximum camber ratio cmax/C monotonically decreases with distance from the root toward the tip portion, and thus it is possible to improve the aerodynamic force of the fin effectively.

(3) In some embodiments, in the above configuration (1) or (2), provided that H is a height of the fin and h is a position coordinate with respect to a height direction of the fin, a height position at which a change rate of the maximum camber ratio cmax/C with respect to h is at maximum is within the height range of not less than 0.7 H and not more than 0.9 H.

In the height range closer to the tip portion than 0.9 H, the importance of the aerodynamic character at the tip portion of the fin is relatively small. Thus, in this height range, to suppress occurrence of a crossflow which may impair generation of longitudinal vortices, it is desirable to maintain the maximum camber ratio at a relatively small value. On the other hand, in the height range of less than 0.7 H, it is desirable to maintain the maximum camber ratio at a relatively large value to ensure a fin lift.

In this regard, as in the above (3), the fin is configured such that the height range of not less than 0.7 H and not more than 0.9 H includes the height position where the change rate of the maximum camber ratio cmax/C reaches its maximum. Accordingly, while ensuring a lift by setting the maximum camber ratio to a relatively large value in the fin height range of less than 0.7 H, it is possible to effectively suppress a crossflow by setting the maximum camber ratio to a relatively small value in a height range of more than 0.9 H, where the influence of the fin on the lift is small. As a result, it is possible to enhance the separation suppressing effect of the vortex generator.

(4) In some embodiments, in any one of the above configurations (1) to (3), the fin is configured such that an angle of a fin chord with reference to a wind inflow direction is not less than 12 degrees and not more than 18 degrees.

The angle of the fin chord with reference to the wind inflow direction corresponds to the attack angle of the fin. If the attack angle is too large, the flow around the fin is more likely to separate at the side of the leading edge of the fin, which may cause stall. In contrast, if the attack angle of the fin is too small, it may be impossible to obtain a preferable lift for generating longitudinal vortices. According to studies conducted by the present inventors, as in the above (4), with the angle of the fin chord with respect to the wind inflow direction being not less than 12 degrees and not more than 18 degrees, it is possible to stabilize generation of longitudinal vortices by the vortex generator, and to improve the effect to suppress separation.

(5) In some embodiments, in any one of the above configurations (1) to (4), the fin is configured such that L/H satisfies $2.0 \leq L/H \leq 4.0$, provided that L/H is a ratio of a chord length L of a fin root to a height H of the fin.

Generally, a lift slope varies depending on the planar shape of the blade (fin), and the lift coefficient that can be achieved at the same attack angle varies depending on the aspect ratio L/H. Thus, to promote generation of longitudinal vortices and enhance the effect to suppress separation, it is desirable to provide a threshold for the aspect ratio of the fin. Thus, according to findings of the present inventors, as in the above configuration (5), with the fin having a shape such that L/H satisfies $2.0 \leq L/H \leq 4.0$, it is possible to achieve a lift that is effective in generation of longitudinal vortices, and to enhance the separation suppressing effect of the vortex generator.

(6) In some embodiments, in any one of the above configurations (1) to (5), the pressure surface of the fin is formed by a flat surface at least in a part of a region where x/C is not less than 0.3, provided that x/C is a non-dimensional position with respect to a fin chordwise direction normalized by the fin chord length C.

When longitudinal vortices are generated, the pressure of a flow around the fin is high at the pressure surface side, and low at the suction surface side. That is, longitudinal vortices are generated through occurrence of a flow from the high-pressure pressure surface side toward the low-pressure suction surface side. Thus, to promote generation of longitudinal vortices and enhance the separation suppressing effect, it is desirable to maintain a high pressure at the pressure surface side of the fin. With the above configuration (6), the pressure surface of the fin is formed by a flat surface at least in a part of a region where x/C is not less than 0.3, provided that x/C is a non-dimensional position with respect to a fin chordwise direction, and thereby it is possible to suppress a speed increase of the flow on the flat surface of the pressure side, and to maintain a high pressure at the pressure side. As a result, at the pressure side and the suction side, it is possible to maintain a pressure difference suitable for generation of longitudinal vortices, and to improve the separation suppressing effect of the vortex generator.

(7) In some embodiments, in any one of the above configurations (1) to (6), the fin is configured such that, in the height range of not less than 0.5 H and not more than 0.85 H, a maximum blade thickness ratio tmax/C satisfies $0.10 \leq tmax/C \leq 0.12$, provided that the maximum blade thickness ratio tmax/C is a ratio of a fin maximum blade thickness tmax to the fin chord length C.

According to findings of the present inventors, while a typical environment of usage of the vortex generator for a wind turbine is viscosity-dominant (approximately, $Re=10^3$ to $10^4$), with the fin maximum blade-thickness ratio tmax/C set to be not less than 0.10 and not more than 0.12, it is possible to suppress separation at the suction surface of the fin, and to improve a lift coefficient and a lift-to-drag ratio of the fin.

More specifically, if the fin maximum blade-thickness ratio tmax/C is more than 0.12, a lift of the fin may be maintained but a drag starts to increase, which leads to a decrease in a lift-drag ratio of the fin. On the other hand, if the fin maximum blade-thickness ratio tmax/C is less than 0.10, separation may occur from the vicinity of the leading edge of the fin, which leads to a failure in maintaining a lift. Thus, a lift-drag ratio of the fin decreases. Accordingly, with the fin maximum blade-thickness ratio tmax/C being set to be not less than 0.10 and not more than 0.12, it is possible to improve the lift coefficient and the lift-to-drag ratio of the fin.

In the case of a fin of a vortex generator, provided that the fin height is zero at the root of the fin, the flow velocity at the fin height of 0.5 H corresponds to approximately 90% of the flow velocity of the main stream, and the fin shape in a range toward the fin tip portion from 0.5 H, including 0.5 H (range of $0.5 H \leq h$) has a great influence on the aerodynamic performance of the entire fin. Further, from a structural point of view, in the above region in the vicinity of the tip portion of the fin, the fin maximum blade-thickness ratio is desired to be higher to ensure a certain dimension of the fin maximum blade thickness tmax.

Thus, as in the above (7), with the fin maximum blade-thickness ratio tmax/C set within the above numerical range in the height range of not less than 0.5 L and not more than 0.85 L, it is possible to improve aerodynamic performance of the fin effectively while ensuring the strength of the fin.

(8) In some embodiments, in any one of the above configurations (1) to (7), in a side view, the fin includes: a first edge forming a connection portion between the fin and a surface of the wind turbine blade; a second edge intersecting with the first edge, being positioned upstream of the first edge with respect to a wind inflow direction, and forming an upstream end portion of the fin; and a third edge intersecting with the first edge, being positioned downstream of the second edge with respect to the wind inflow direction, and forming a downstream end portion of the fin.

(9) In some embodiments, in the above configuration (8), in the fin, the second edge is oblique with respect to a fin height direction so as to extend toward a wake side with distance toward the tip portion of the fin.

With the above configuration (9), with the second edge (an edge forming the leading edge of the fin) disposed oblique to the fin height direction so as to get closer to the wake side toward the tip portion of the fin, it is possible to generate longitudinal vortices for promoting momentum exchange between inside and outside of the boundary layer at the wake side of the fin.

(10) In some embodiments, in the above configuration (8) or (9), the first edge and the third edge form an angle of 90 angular degrees.

(11) In some embodiments, in any one of the above configurations (8) to (10), in a side view, the fin further includes a fourth edge having a linear shape or a curved shape, the fourth edge forming a tip in a height direction of the fin.

A region in the vicinity of the tip portion of the fin has a relatively small importance with regard to aerodynamic character due to an influence of longitudinal vortices generated at the tip portion of the fin. Thus, with the above configuration (11), the tip portion of the fin, which has less influence on aerodynamic performance of the entire fin, is cut off to form the fourth edge, and thereby it is possible to enhance safety of workers who handle the vortex generator and to reduce induced drag that may be generated at the fin.

(12) In some embodiments, in the above configuration (11), a chord length at the fourth edge is 2 to 10% of the chord length at the root.

With the above configuration (12), with the chord length of the fourth edge being 2 to 10% of the chord length at the root, it is possible to ensure the safety of workers during handling of the vortex generator, while maintaining the aerodynamic performance of the vortex generator.

(13) In some embodiments, in any one of the above configurations (1) to (12), the vortex generator further includes a platform portion to be mounted to a surface of the wind turbine blade, the platform portion having a front surface on which the fin is to be erected and a flat bottom surface disposed opposite to the front surface. The platform portion has a curved convex cross-sectional shape at least along a blade spanwise direction of the wind turbine blade.

With the above configuration (13), the platform portion of the vortex generator has a curved convex cross-sectional shape along the blade spanwise direction, and thereby the platform portion is deformable in accordance with bending deformation of the wind turbine blade, which makes it possible to disperse stress generated at the platform portion. Thus, it is possible to reduce a risk of falling off of the vortex generator from the surface of the wind turbine blade.

(14) In some embodiments, in any one of the above configurations (1) to (13), the vortex generator includes a plurality of fin sets each including a pair of fins arranged so that the suction surfaces face each other, and a ratio $S/H$ of an interval S of trailing edges of the pair of fins to a height H of the fins satisfies $2.5 \leq S/H \leq 4.0$.

As S/H decreases, the interval between the generated longitudinal vortices decreases, and interference among the longitudinal vortices may cause reduction of the effect to suppress separation. In addition, an increased number of fins may increase drag of the vortex generator itself. On the other hand, as S/H increases, the interval between the generated longitudinal vortices increases. In this case, there are many locations without any longitudinal vortex in the mounting range of the vortex generator on the wind turbine blade, which may cause reduction of the effect to suppress separation. Thus, as in the above (14), with S/H satisfying $3.0 \leq S/H \leq 4.0$, it is possible to effectively achieve the technical benefit from provision of the vortex generator.

(15) A wind turbine blade assembly according to at least one embodiment of the present invention includes: a wind turbine blade; and the vortex generator according to any one of (1) to (14) mounted to a surface of the wind turbine blade.

With the above configuration (15), as described in the above (1), in at least a part of the height range of the fin of the vortex generator, the maximum camber ratio $c_{max}/C$ being a ratio of the maximum camber $c_{max}$ to the fin chord length C decreases with distance from the root of the fin toward the tip portion of the fin, and thus it is possible to suppress a pressure decrease on the suction surface side at the fin tip portion side, and to suppress occurrence of a crossflow, which may impair generation of longitudinal vortices. As a result, it is possible to enhance the separation suppressing effect of the vortex generator.

According to at least one embodiment of the present invention, it is possible to suppress occurrence of a crossflow, which is an obstructive factor of generation of longitudinal vortices, and to achieve an improved separation suppressing effect of a vortex generator.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
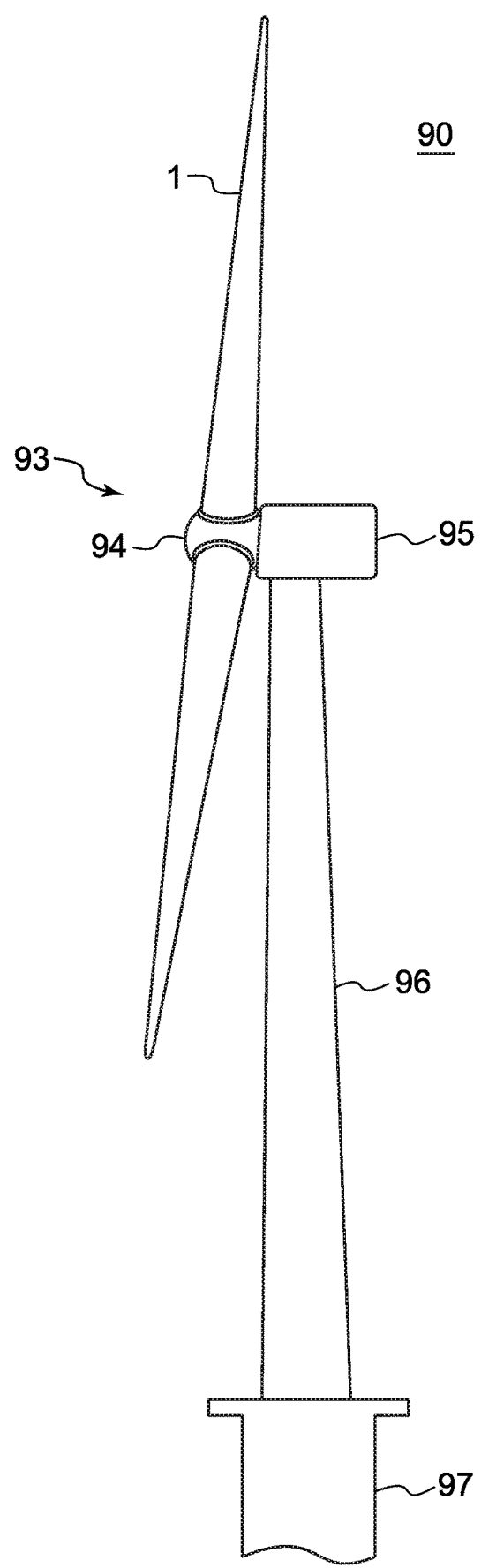
FIG. 1 is a schematic configuration diagram of a wind turbine power generating apparatus according to an embodiment.
Figure 2:
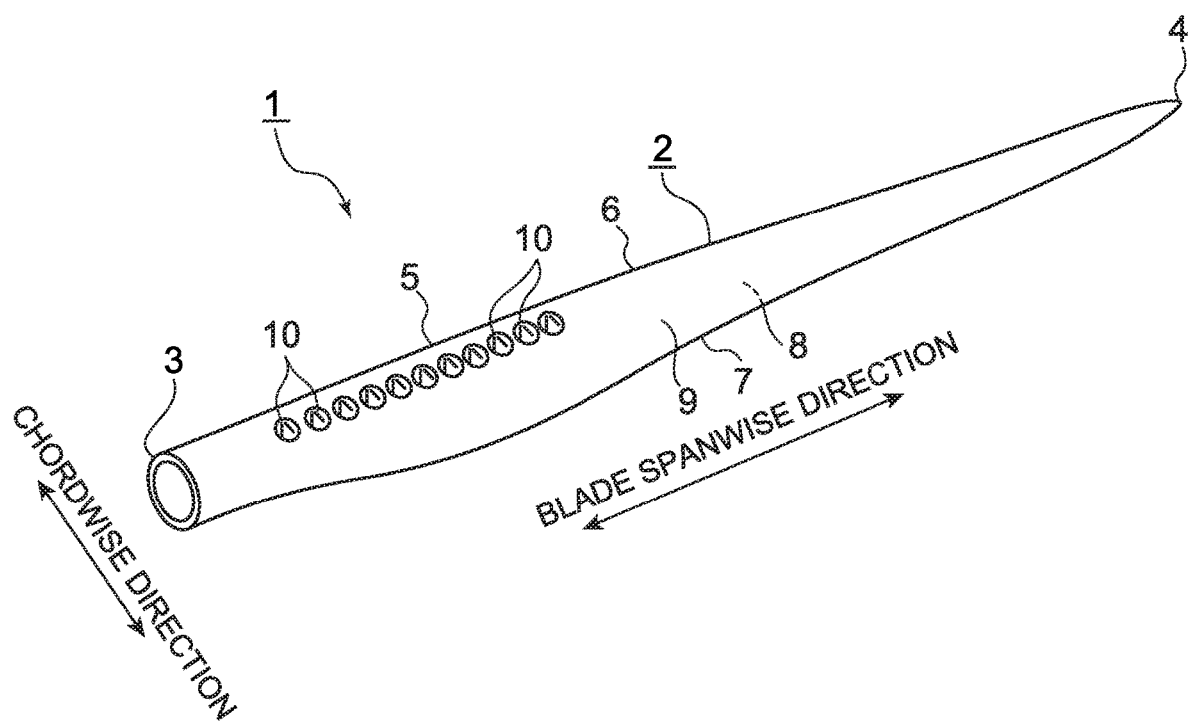
FIG. 2 is a perspective view of a wind turbine blade assembly including a vortex generator according to an embodiment.

With reference to FIGS. 1 and 2, overall configuration of a wind turbine blade assembly and a wind turbine power generating apparatus to which a vortex generator according to some embodiments is to be applied will be described. FIG. 1 is a schematic configuration diagram of a wind turbine power generating apparatus according to an embodiment. FIG. 2 is a perspective view of a wind turbine blade assembly to which a vortex generator according to an embodiment is to be applied.

As shown in FIG. 1, a wind turbine power generating apparatus 90 includes at least one (e.g. three) wind turbine blade assemblies 1. The wind turbine blade assemblies 1 include a wind turbine blade 2 and a vortex generator 10.

The wind turbine blade assemblies 1 are mounted to a hub 94 in a radial fashion, and the wind turbine blade assemblies 1 and the hub 94 constitute a rotor 93 of the wind turbine power generating apparatus 90. The rotor 93 rotates in response to wind received by the wind turbine blade assemblies 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed on water or on land.

As described below, a vortex generator 10 according to an embodiment is mounted to the wind turbine blade 2 of the wind turbine blade assembly 1, in the wind turbine power generating apparatus 90 having the above configuration.

As shown in FIG. 2, the wind turbine blade assembly 1 includes a wind turbine blade 2. The vortex generator 10 according to an embodiment is mounted to the surface (blade surface) of the wind turbine blade 2. In FIG. 2, the vortex generator 10 is already mounted to the wind turbine blade 2 of the wind turbine blade assembly 1.

The wind turbine blade 2 includes a blade root 3 to be mounted to the hub 94 of the wind turbine power generating apparatus 90, a blade tip 4 positioned farthest from the hub 94, and an airfoil part 5 extending between the blade root 3 and the blade tip 4. The wind turbine blade 2 has a leading edge 6 and a trailing edge 7 from the blade root 3 to the blade tip 4. Further, an exterior shape of the wind turbine blade 2 is formed by a pressure surface 8 and a suction surface 9 disposed opposite to the pressure surface 8.

As shown in FIG. 2, in the wind turbine blade assembly 1, a plurality of the vortex generators 10 are mounted to the suction surface 9 of the wind turbine blade 2. Furthermore, the plurality of vortex generators 10 are mounted to the suction surface 9 of the wind turbine blade 2 in a blade spanwise direction.

Hereinafter, "blade spanwise direction" refers to a direction connecting the blade root 3 and the blade tip 4, and "blade chordwise direction" refers to a direction along a line (chord) connecting the leading edge 6 and the trailing edge 7 of the wind turbine blade 2.

Figure 3:
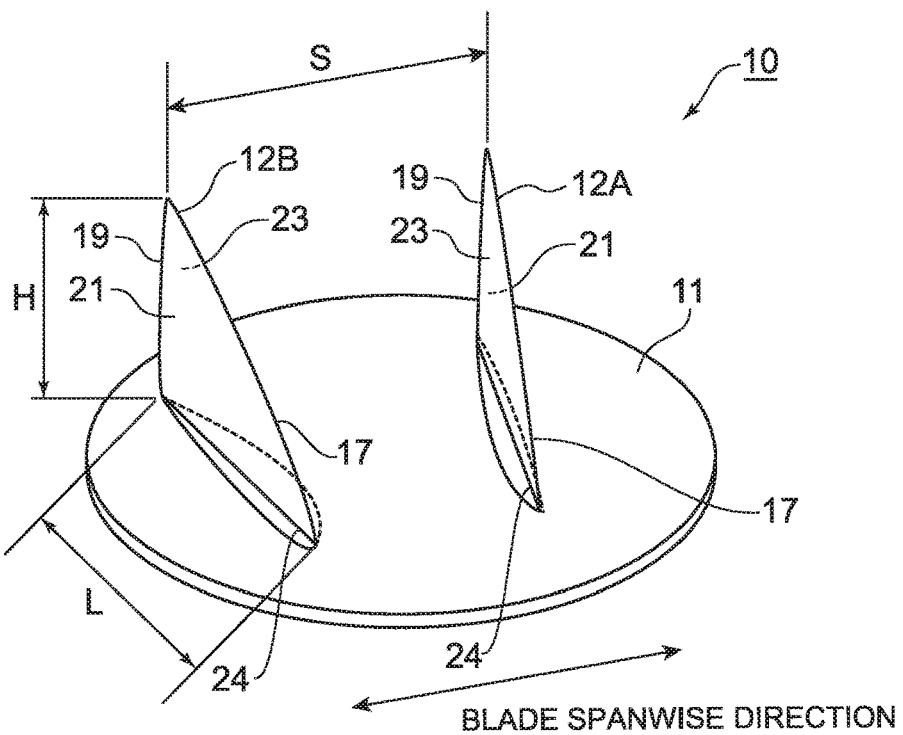
FIG. 3 is a perspective view of a vortex generator according to an embodiment.
Figure 4:
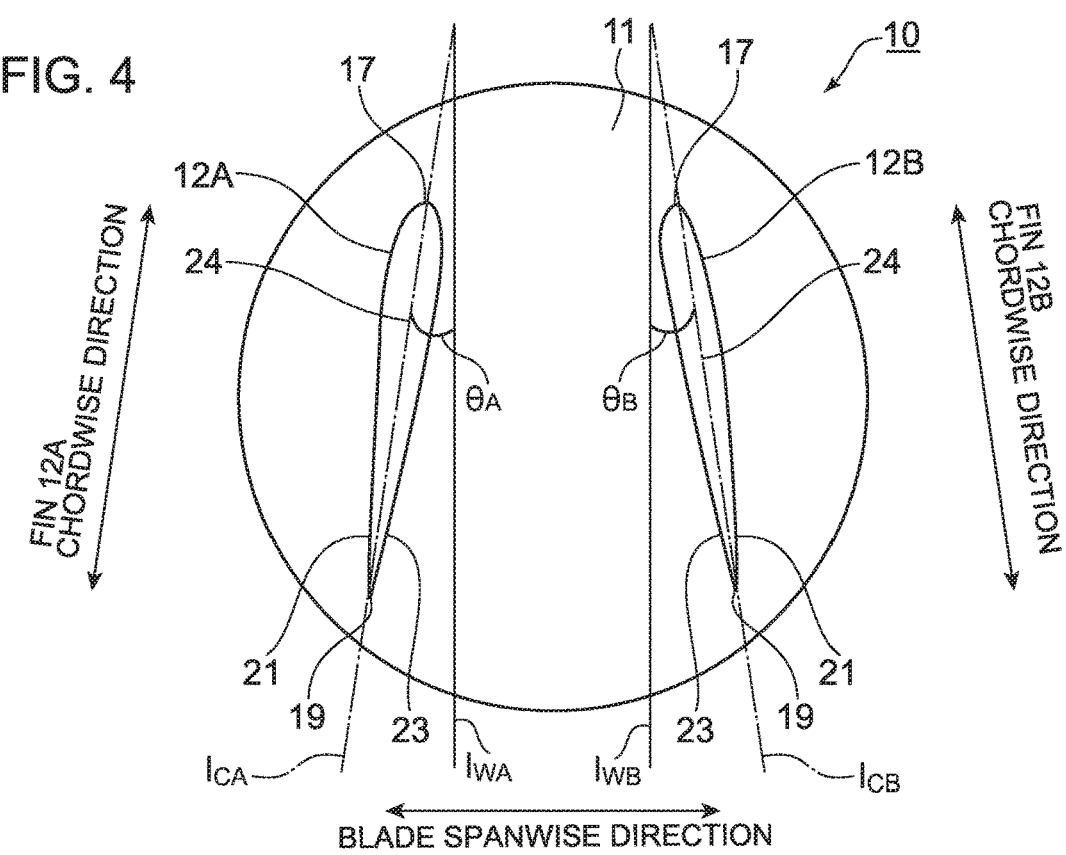
FIG. 4 is a top view of a vortex generator according to an embodiment.
Figure 5:
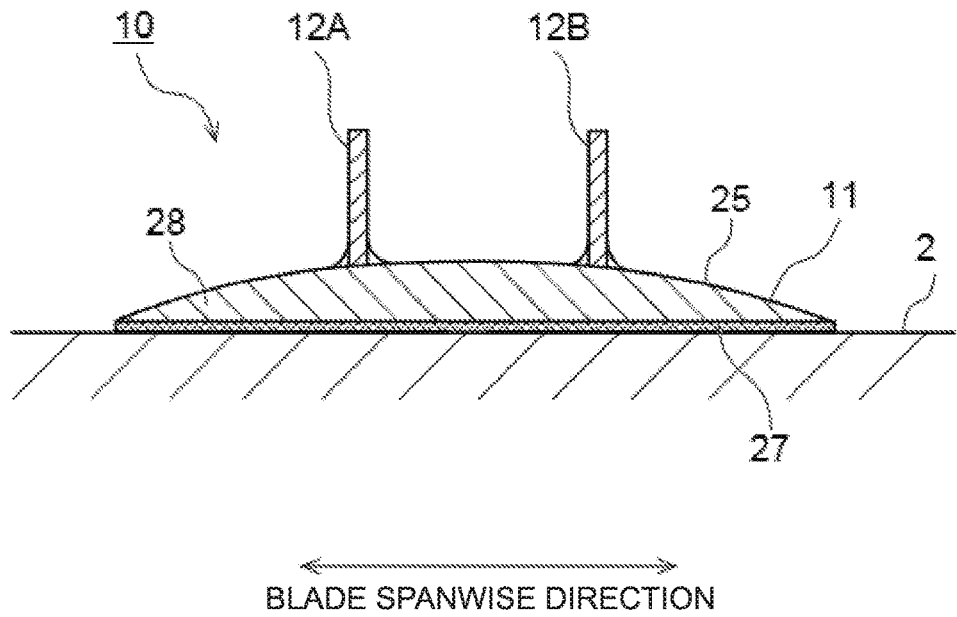
FIG. 5 is a cross-sectional view of a vortex generator according to an embodiment, taken along the blade spanwise direction.

Next, the configuration of the vortex generator 10 will be described in detail with reference to FIGS. 3 to 5. FIG. 3 is a perspective view of a vortex generator according to an embodiment. FIG. 4 is a top view of a vortex generator according to an embodiment. FIG. 5 is a cross-sectional view of a vortex generator according to an embodiment, taken along the blade spanwise direction.

As shown in FIG. 3, the vortex generator 10 according to some embodiments includes a platform portion 11 fixed to a surface of the wind turbine blade assembly 1 (more specifically, to a surface of the wind turbine blade 2) and at least one fin 12 disposed upright on the platform portion 11. In the embodiment shown in FIGS. 3 to 5, the vortex generator 10 includes a pair (two in total) of fins 12 (12A, 12B) disposed so as to be adjacent to each other on the platform portion 11.

In the embodiment shown in FIGS. 3 and 4, the platform portion 11 has a circular shape in a top view.

In some embodiments, the platform portion 11 may have a shape other than a circular shape. For instance, the platform portion 11 may have an oval shape, or may have a polygonal shape such as a rectangular shape.

Furthermore, in some embodiments, the vortex generator 10 may not necessarily include the platform portion 11, and the fin 12 may be directly mounted to the wind turbine blade 2.

In some embodiments, the fin 12 is configured such that a ratio L/H of the chord length L of the fin root to the height H of the fin 12 satisfies 2.0≤L/H≤4.0 (see FIG. 3).

Generally, a lift slope (a manner of increase of lift coefficient with respect to attack angle) varies depending on the planar shape of the blade, and the lift coefficient that can be achieved at the same attack angle varies depending on the aspect ratio L/H. To obtain a desirable lift F for generating longitudinal vortices 29 (described below), the aspect ratio L/H should be higher. However, an excessively high aspect ratio L/H leads to reduction of the lift slope, which may make it difficult to obtain a sufficient lift F to generate longitudinal vortices 29. Accordingly, to obtain a suitable lift F for generating longitudinal vortices 29 with respect to the angle (attack angle) formed between the wind inflow direction and the fin chord 24, it is desirable to set a threshold for the aspect ratio L/H of the fin 12.

Thus, in the present embodiment, with the fin 12 having a shape such that L/H satisfies 2.0≤L/H≤4.0, it is possible to achieve a lift F that is effective in generating longitudinal vortices 29, and to enhance the effect of the vortex generator 10 to suppress separation.

In some embodiments, a ratio S/H of the interval S between the trailing edges of a pair of fins 12 to the height H of the fins 12 satisfies 2.5≤S/H≤4.0 (see FIG. 3).

The ratio S/H is a value related to the distance between the trailing edges of a pair of fins 12. The smaller the ratio S/H is, the smaller the distance between longitudinal vortices 29 generated on the side of the trailing edges 19 of the fins 12. Thus, the longitudinal vortices 29 may intervene with each other, which may cause reduction of the effect to suppress separation. In addition, the smaller the ratio S/H is, the greater the number of the fins 12 is in the mounting region of the vortex generator 10 on the wind turbine blade 2. Thus, drag of the vortex generator 10 itself increases, which may cause occurrence of drag penalty. On the other hand, as the S/H increases, the interval between the generated longitudinal vortices 29 increases. In this case, there are many locations without any longitudinal vortex 29 in the mounting range of the vortex generator 10 on the wind turbine blade 2, which may cause reduction of the effect to suppress separation. Accordingly, with S/H satisfying 2.5≤S/H≤4.0 as in the present embodiment, it is possible to effectively achieve the technical benefit from provision of the vortex generators 10.

FIG. 4 is a planar view of the vortex generator 10 shown in FIG. 3. In some embodiments, the angle θ ($\theta_A$, $\theta_B$) formed between the segment $1_w$ ($1_{wA}$, $1_{wB}$) along the wind inflow direction and the extension line $1_C$ ($1_{CA}$, $1_{CB}$) of the fin chord 24 is not less than 12 degrees and not more than 18 degrees.

The angle θ of the fin chord 24 with reference to the wind inflow direction corresponds to the attack angle of the fin 12. If the attack angle is too large, the flow around the fin 12 is more likely to separate at the side of the leading edge 17 of the fin 12, which may cause stall. In contrast, if the attack angle of the fin 12 is too small, it may be impossible to obtain a suitable lift for generating longitudinal vortices. According to studies conducted by the present inventors, with the angle θ of the fin chord 24 with respect to the wind inflow direction being not less than 12 degrees and not more than 18 degrees, it is possible to stabilize generation of longitudinal vortices by the vortex generator 10, and to improve the effect to suppress separation.

In FIG. 5, depicted is a cross section 28 of the platform portion 11 of the vortex generator 10 taken along the blade spanwise direction. As shown in FIG. 5, in the vortex generator 10 according to some embodiments, the platform portion 11 has a front surface 25 exposed to outside, and a back surface 27 opposite to the front surface 25 of the wind turbine blade 2. As shown in FIG. 5, in some embodiments, the cross section 28 of the platform portion 11 has a curved convex shape along the blade spanwise direction.

Herein, "curved convex shape" refers to a shape that bulges in a direction away from the wind turbine blade 2 to have, at least partially, a bulged portion with a curved profile (the shape of the front surface 25 of the platform portion 11). The profile of the bulged portion may be formed by an arc having a single curvature radius as in the embodiment depicted in FIG. 5, or may be formed by combination of a plurality of arcs having different curvature radii, or a combination of arcs having one or more curvature radii and one or more straight lines, in another non-depicted embodiment.

During operation of the wind turbine power generating apparatus 90, the wind turbine blade 2 deforms flexurally due to bending deformation caused by an aerodynamic load. Thus, a high stress is applied to the platform portion 11 of the vortex generator 10 mounted to the surface of the wind turbine blade 2. In this regard, with the above embodiment, the platform portion 11 of the vortex generator 10 has a curved convex cross-sectional shape along the blade spanwise direction of the wind turbine blade 2, and thereby the platform portion is deformable in accordance with bending deformation of the wind turbine blade 2, which makes it possible to disperse stress generated at the platform portion 11.

Figure 6:
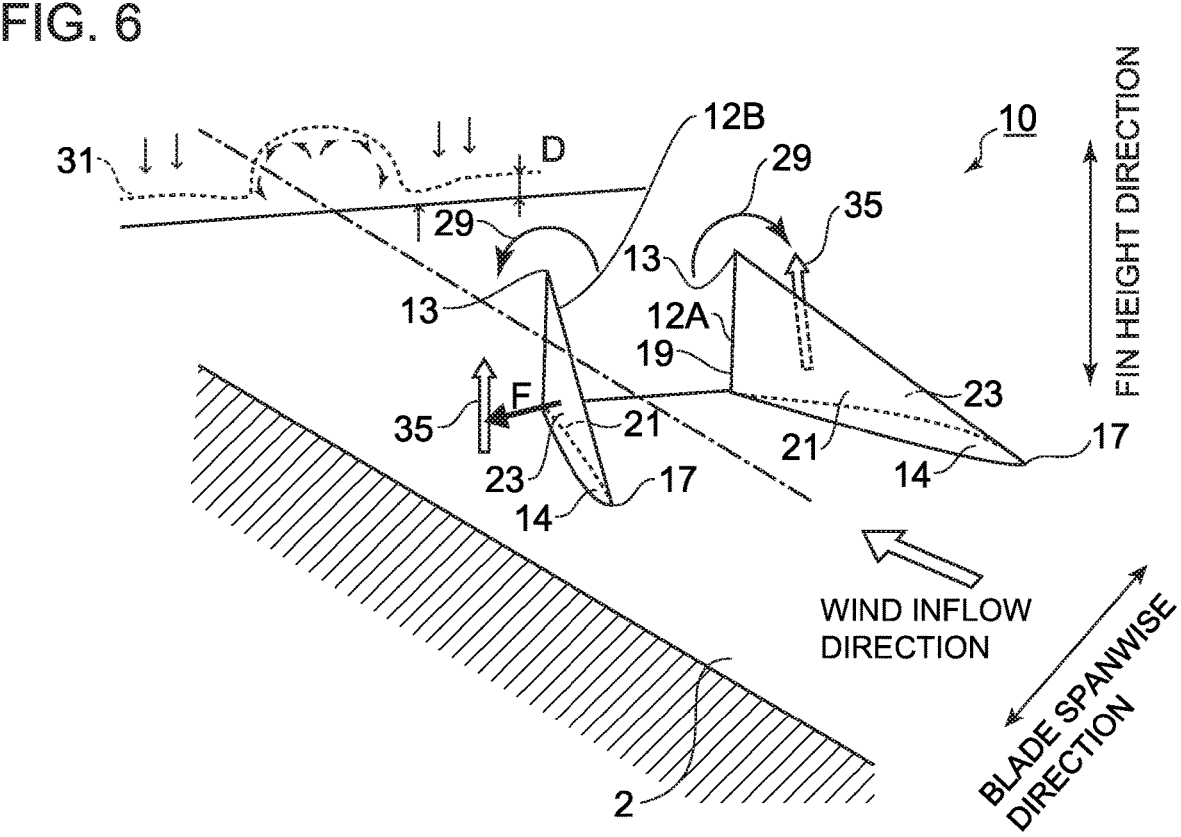
FIG. 6 is a perspective view for describing a flow around the fin of a vortex generator according to an embodiment.

An aerodynamic function of the vortex generator 10 will now be described briefly. FIG. 6 is a perspective view for describing the function of the vortex generator 10. In FIG. 6, only a pair of adjacent fins 12A, 12B is depicted, from among a fin row (a plurality of pairs of fins 12A, 12B) formed by arranging a plurality of vortex generators 10 shown in FIGS. 3 and 4 in the blade spanwise direction of the wind turbine blade 2.

Separation of a flow at the suction surface 9 of the wind turbine blade 2 takes place due to a boundary layer becoming gradually thicker from a streamline flow region in the vicinity of the leading edge 6 toward a turbulent flow region downstream thereof, and the flow being separated before arriving at the trailing edge 7.

As shown in FIG. 6, the vortex generator 10 mounted to the wind turbine blade 2 normally generates longitudinal vortices 29 on the side of the suction surface 23 of the fin 12 with a lift F produced by the fin 12. The longitudinal vortices 29 promote momentum exchange between outside and inside of a boundary layer 31 at a wake side of the fin 12. Accordingly, in the region between the suction surfaces 23 of the adjacent fins 12, the thickness D of the boundary layer 31 of wake of the fins 12 decreases. Thus, with the plurality of fins 12 arranged in the blade spanwise direction, the boundary layer 31 at the surface of the wind turbine blade 2 becomes thin as a whole, which suppresses trailing edge separation of the wind turbine blade 2.

However, as a result of research by the present inventors, it was found that, in a case where the maximum camber ratio cmax/C is relatively large in the vicinity of the fin tip portion 13, a flow that flows from the root 14 of the fin 12 toward the tip portion 13 of the fin (the crossflow 35 in FIG. 6) may occur.

Figure 7:
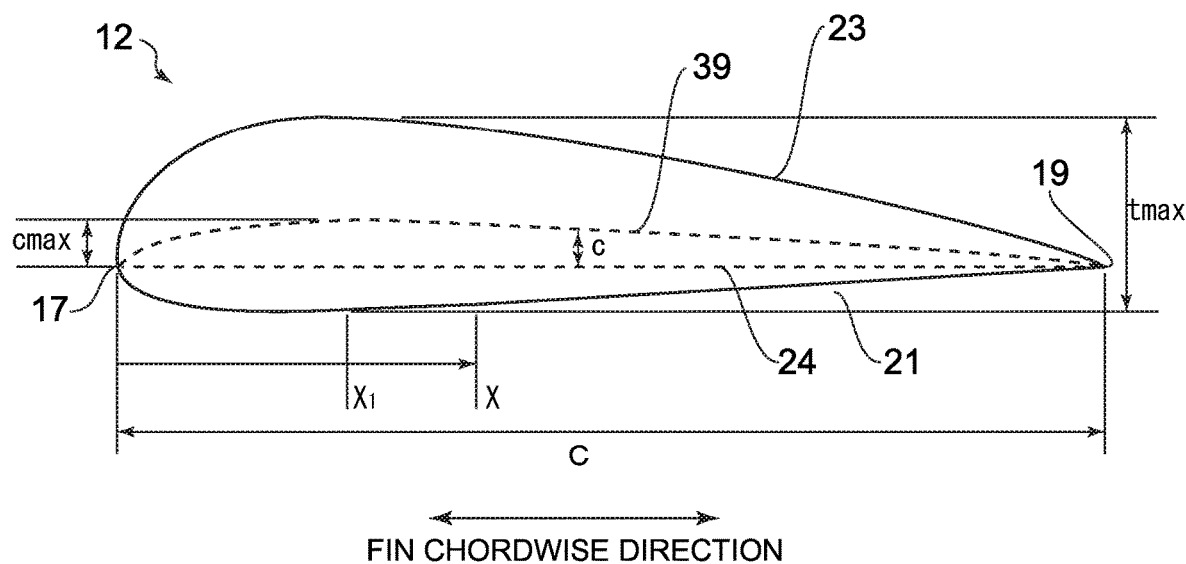
FIG. 7 is a cross-sectional view of a fin of a vortex generator according to an embodiment, taken in a height direction.

The mechanism of occurrence of the crossflow 35 will now be described with reference to FIG. 7. FIG. 7 is a cross-sectional view in the height direction of the fin 12. Herein, the mean line 39 in FIG. 7 is a line connecting points that are positioned at the same distance from the pressure surface 21 and the suction surface 23 in the chordwise directional position x along the chordwise direction. The camber c is the distance between the fin chord 24 and the mean line 39. The maximum camber cmax is the value of the largest camber c in the cross-section.

The maximum camber ratio cmax/C is a ratio of the maximum camber cmax to the chord length C. If the maximum camber ratio cmax/C is large, the protruding shape toward the suction surface 23 becomes larger compared to a case where the maximum camber ratio cmax/C is small. Thus, the flow passage on the side of the suction surface 23 becomes longer compared to a case where the maximum camber ratio cmax/C is small, and the flow on the side of the suction surface 23 becomes faster. As a result, in a case where the maximum camber ratio cmax/C is large, the pressure on the side of the suction surface 23 becomes relatively lower.

At the side of the fin tip portion 13, with the pressure on the suction surface 23 decreased as described above by setting a large maximum camber ratio cmax/C, a pressure gradient is generated in the fin height direction at the side of the suction surface 23 of the fin 12, which leads to occurrence of the crossflow 35 that flows from the root 14 of the fin 12, where the pressure is relatively high, toward the tip portion 13 of the fin, where the pressure is relatively low (see FIG. 6). As shown in FIG. 6, the crossflow 35 is a flow in a direction opposite to that of the longitudinal vortices 29, and thus impairs generation of the longitudinal vortices 29, which may prevent achievement of a sufficient separation suppressing effect of the vortex generator 10.

Figure 8:
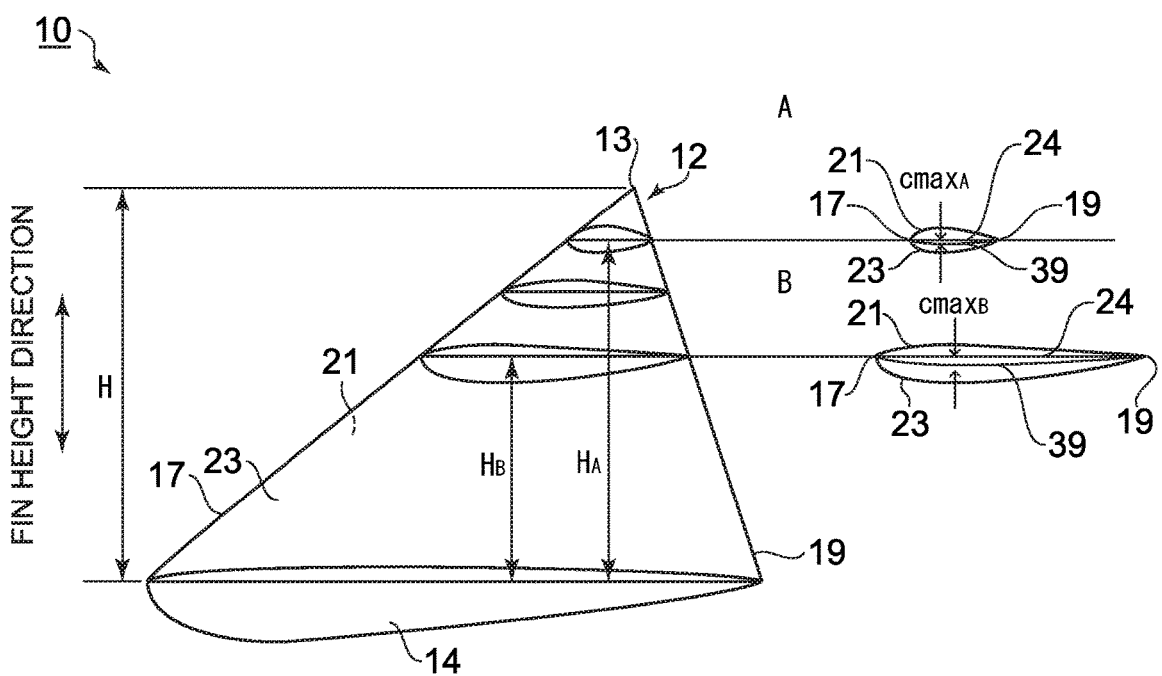
FIG. 8 is a diagram showing a change in the cross-sectional shape of a fin of a vortex generator according to an embodiment with respect to the height direction.
Figure 9:
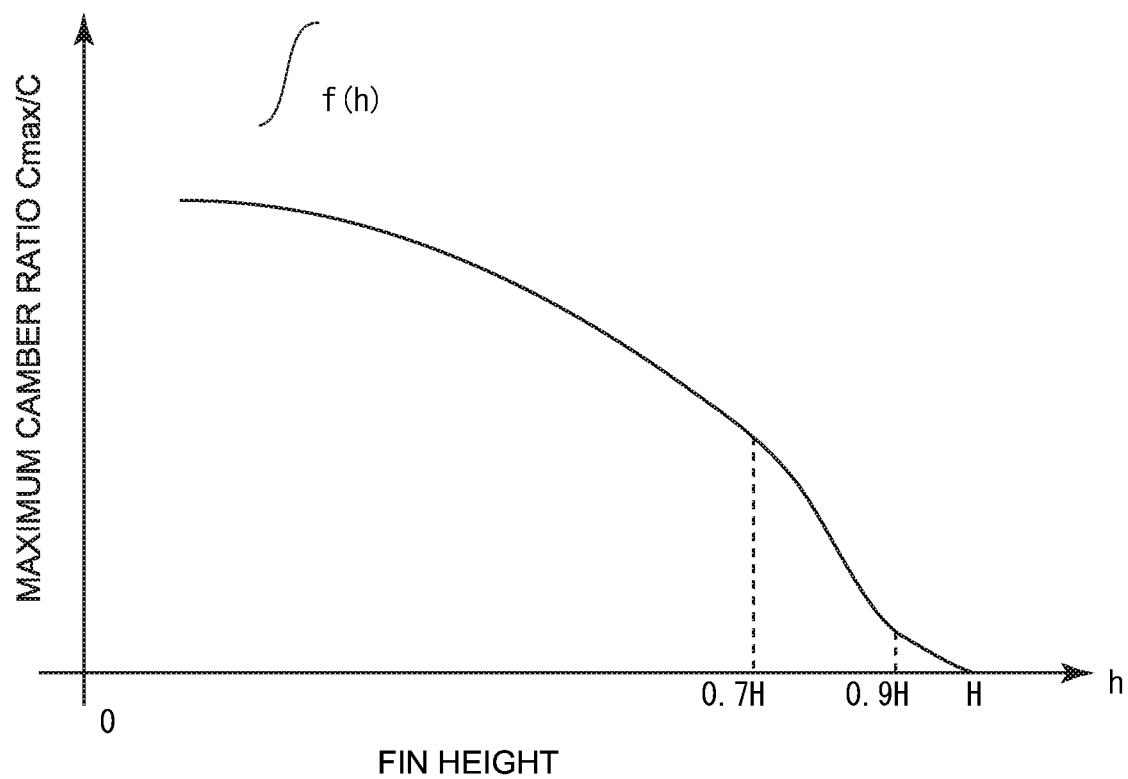
FIG. 9 is a graph showing the relationship of the fin height and the maximum camber ratio of a vortex generator according to an embodiment.

Some embodiments will be described below with reference to FIGS. 8 to 9. FIG. 8 is a diagram showing a change in the shape of the fin 12 according to some embodiments with respect to the height direction. FIG. 9 is a graph showing the relationship of the fin height h and the maximum camber ratio cmax/C according to an illustrative embodiment.

The vortex generator 10 according to some embodiments are configured, in at least a part of the height range of the fin 12, such that the maximum camber ratio cmax/C decreases from the root 14 of the fin 12 toward the tip portion 13 of the fin 12. According to the embodiment shown in FIG. 8, with distance from the height position $H_B$ toward the height position $H_A$ of the tip portion 13, the protruding shape on the side of the suction surface 23 decreases, and the cross-section of the fin 12 approaches asymptotically to a line-symmetric shape (droplet shape) with respect to the fin chord 24. When comparing the cross section A at the height position $H_A$ and the cross section B at the height position $H_B$, the cross section A, which is closer to the tip portion 13 of the fin 12, has a smaller maximum camber cmax than the cross section B.

According to the present embodiment, the maximum camber ratio cmax/C is reduced at the side of the tip portion 13 of the fin 12 to reduce the speed of the flow at the side of the suction surface 23, and thereby it is possible to suppress a pressure decrease of the suction surface 23 at the side of the tip portion 13 of the fin 12. As a result, it is possible to suppress occurrence of the crossflow 35, which may be an obstructive factor of generation of longitudinal vortices 29, and to achieve an improved separation suppressing effect of the vortex generator 10 adequately.

In an embodiment, the vortex generator 10 may be configured, in at least a part of the height range of not less than 0.5 H, such that the maximum camber ratio cmax/C monotonically decreases with distance from the root 14 of the fin 12 toward the tip portion 13 of the fin 12.

Generally, for a certain Reynolds number, there is an optimum maximum camber ratio cmax/C for obtaining a necessary lift F. This is because, although the lift F at the zero-degree attack angle increases as the camber c increases, an excessively large camber c may cause separation. Thus, for the vortex generator 10 according to some embodiments, it is desirable to set an optimum maximum camber ratio cmax/C corresponding to the Reynolds number, in order to obtain a sufficient lift F that is required for generation of longitudinal vortices 29, from the root 14 to the vicinity of the center of the fin 12. On the other hand, toward the tip portion 13 of the fin 12, it is desirable to reduce the maximum camber ratio cmax/C as described above, in order to suppress a pressure decrease on the side of the suction surface 23 in the vicinity of the tip portion 13 of the fin 12.

Thus, with the configuration of the present embodiment, at least in a part of the height range of not less than 0.5 H, which is the center of the fin 12, the maximum camber ratio cmax/C monotonically decreases from the root 14 toward the tip portion 13, and thus it is possible to improve the aerodynamic performance of the fin 12 effectively.

FIG. 9 is a graph showing the relationship of the fin height h and the maximum camber ratio cmax/C according to an illustrative embodiment. In the example shown in FIG. 9, the relationship between the fin height h and the maximum camber ratio cmax/C is shown as a function f (h).

In some embodiments, a height position where the change rate of the maximum camber ratio cmax/C to the fin height h reaches its maximum is within the height range of not less than 0.7 H and not more than 0.9 H. Herein, the change rate of the maximum camber ratio cmax/C to the fin height h refers to the absolute value of the differential value df(h)/dh obtained by differentiating the function f (h) with respect to h.

As described above, to suppress the crossflow 35 that impairs generation of longitudinal vortices 29, it is important to set a relatively smaller maximum camber ratio cmax/C in the vicinity of the tip portion 13 of the fin 12. In particular, in the height range closer to the tip portion than 0.9 H, the importance of the aerodynamic character at the tip portion of the fin is relatively small, and thus it is desirable to prioritize suppression of a crossflow over lift increase, maintaining the maximum camber ratio at a relatively small value. On the other hand, in the height range of less than 0.7 H, it is desirable to maintain the maximum camber ratio at a relatively large value to ensure a fin lift.

Thus, according to the present embodiment, the fin 12 is configured such that the height range of not less than 0.7 H and not more than 0.9 H includes the height position where the change rate of the maximum camber ratio cmax/C reaches its maximum. Accordingly, while ensuring a lift by setting the maximum camber ratio cmax/C to a relatively large value in the fin height range of less than 0.7 H, it is possible to effectively suppress a crossflow by setting the maximum camber ratio to a relatively small value in the height range of more than 0.9 H, where the influence of the fin on the lift is small.

In the example shown in FIG. 9, the function f(h) is a function that monotonically decreases on the constant basis with an increase in the fin height h. However, the present embodiment is not limited to this. In an embodiment, in at least a part of the height range on the side of the root 14 of the fin 12, the maximum camber ratio cmax/C may be maintained at the same value or increased.

Furthermore, in view of the aerodynamic performance of the fin 12, in at least a part of the height range on the side of the root 14 of the fin 12, an appropriate camber value with respect to the Reynolds number may be maintained. As a result, it is possible to effectively obtain a lift F for forming longitudinal vortices 29 while suppressing the crossflow 35.

Next, some embodiments related to the airfoil of the fin 12 will be described below, again referring to FIGS. 6 to 7.

In some embodiments, in a region where x/C is not less than 0.3, at least a part of the pressure surface 21 is formed by a flat surface. In FIG. 7, the fin chordwise directional position $x_1$ indicates the position where x/C is 0.3.

The longitudinal vortices 29 are generated by the vortex generator 10, through occurrence of a flow from the pressure surface 21 toward the suction surface 23. This is because, the pressure is relatively higher at the pressure surface 21 than at the suction surface 23, which forms a flow flowing from the high-pressure side toward the low-pressure side. Thus, to generate longitudinal vortices 29 stably, it is desirable to maintain a higher pressure at the pressure surface 21 than at the suction surface 23, and maintain a pressure difference between the pressure surface 21 and the suction surface 23.

In this regard, according to the present embodiment, on the flat surface formed on the pressure surface 21, it is possible to suppress a pressure decrease at the side of the pressure surface 21 due to speed increase of the flow. As a result, at the pressure surface 21 and the suction surface 23, it is possible to maintain a pressure difference suitable for generation of longitudinal vortices 29, and to improve the separation suppressing effect of the vortex generator 10.

An embodiment for achieving the above effect includes the ClarkY airfoil, for instance. The ClarkY airfoil is characterized in that the pressure surface is formed by a flat surface in the region where x/C is not less than 0.3. By employing the ClarkY airfoil according to the present embodiment, it is possible to achieve the above described effect, and also to improve the manufacturability of the vortex generator 10, because most part the pressure surface 21 is formed by a flat surface and can be easily produced. Furthermore, in the ClarkY airfoil, the suction surface 23 is formed by a convex curved surface.

The above described airfoil in which at least a part of the pressure surface 21 is formed by a flat surface in the region where x/C is not less than 0.3 may be employed in at least a part of the height range of the fin 12.

In some embodiments, in the height range of not less than 0.5 H and not more than 0.85 H, the maximum blade thickness ratio tmax/C, which is a ratio of the fin maximum blade thickness tmax to the fin chord length C, satisfies $0.10 \leq tmax/C \leq 0.12$.

The present embodiment is based on a result of numerical calculation conducted by the present inventors, in relation to an influence of the fin maximum blade-thickness ratio tmax/C of the vortex generator 10 on a lift coefficient and a lift-drag ratio of the fin 12. If the fin maximum blade-thickness ratio tmax/C is higher than 0.12, a lift F of the fin 12 may be maintained but a drag starts to increase, which leads to a decrease in a lift-drag ratio of the fin 12. On the other hand, if the fin maximum blade-thickness ratio tmax/C is less than 0.10, separation may occur from the vicinity of the leading edge 17 of the fin 12, which leads to a failure in maintaining the lift F. Thus, the lift-drag ratio of the fin 12 decreases. Accordingly, with the fin maximum blade-thickness ratio tmax/C set to be not less than 0.10 and not more than 0.12, it is possible to improve a lift coefficient and a lift-drag ratio of the fin 12.

Furthermore, the flow velocity at the fin height of 0.5 H corresponds to approximately 90% of the flow velocity of the main stream, and the fin shape in a range toward the fin tip portion 13 from 0.5 H, including 0.5 H (range of $0.5 H \leq h$)

has a great influence on the aerodynamic performance of the entire fin. It should be noted that, however, in a region in the vicinity of the tip portion 13 of the fin (a region of h>0.85 L), importance of aerodynamic character is relatively small due to an influence of vortices generated at the tip portion 13 of the fin. Further, from a structural point of view, in the above region in the vicinity of the tip portion 13 of the fin, the fin maximum blade-thickness ratio is desired to be higher to ensure a certain dimension of the fin maximum blade thickness tmax.

Thus, as in the present embodiment, with the fin maximum blade-thickness ratio tmax/C set within the above numerical range in the height range of not less than 0.5 L and not more than 0.85 L, it is possible to improve aerodynamic performance of the fin 12 effectively while ensuring the strength of the fin 12.

Next, some embodiments related to the side shape of the fin 12 will be described below referring to FIGS. 10 and 11.

Figure 10:
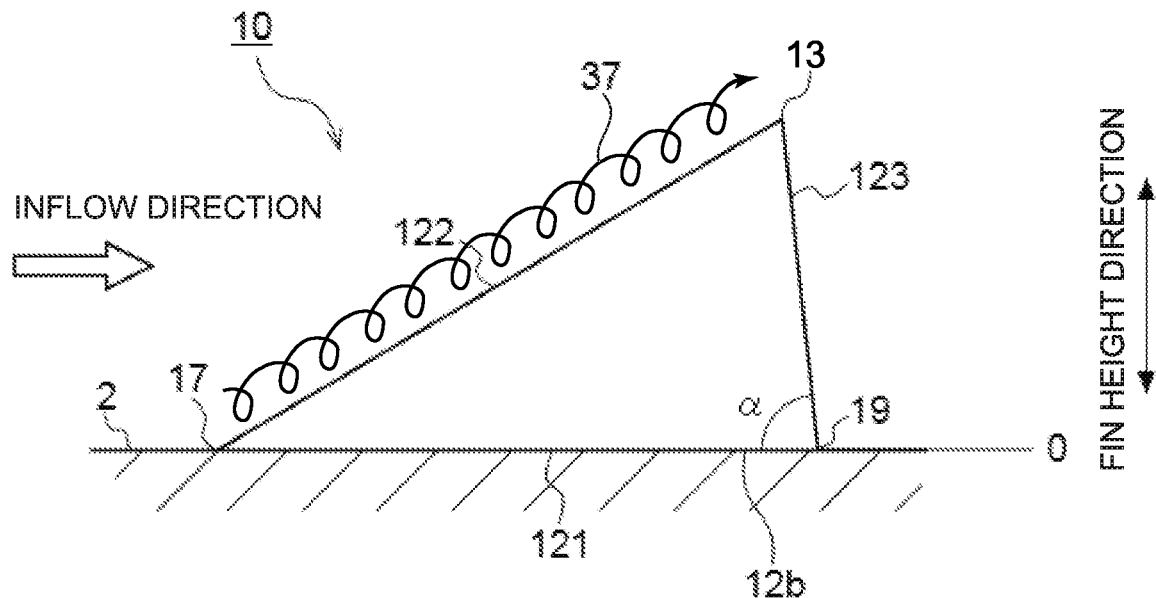
FIG. 10 is a side view of a fin of a vortex generator according to an embodiment.
Figure 11:
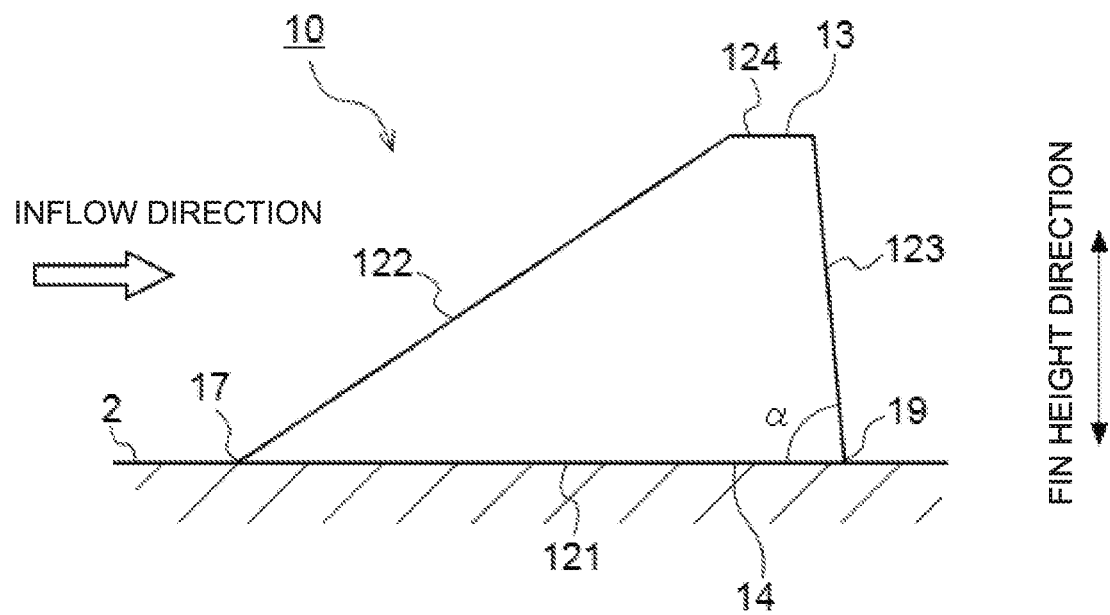
FIG. 11 is a side view of a fin of a vortex generator according to another embodiment.

In some embodiments depicted in FIGS. 10 and 11, the fin 12 has, in a side view, the first edge 121 forming a connecting portion between the fin 12 and the surface of the wind turbine blade 2, the second edge 122 intersecting with the first edge 121, being disposed upstream of the first edge 121 with respect to the in-flow direction of wind, and forming an upstream end portion of the fin 12, and the third edge 123 intersecting with the first edge 121, being disposed downstream of the first edge 121 with respect to the in-flow direction of wind, and forming a downstream end portion of the fin 12.

It should be noted that the fin 12 may have any polygonal shape in a side view, including a triangle (see FIG. 10) formed by the first edge 121, the second edge 122, and the third edge 123, which have a linear shape, and a quadrilateral (see FIG. 11) having the fourth edge 124, which has a linear shape, connecting the second edge 122 and the third edge 123, besides the second edge 122 and the third edge 123, which have a linear shape. Alternatively, though not illustrated, a part of edges constituting a side-view shape of the fin 12, which are three or more edges including the first edge 121, the second edge 122 and the third edge 123, may have a curved shape instead of a linear shape.

In some embodiments depicted in FIGS. 10 and 11 as an example, the second edge 122 may be oblique with respect to the fin height direction so as to get closer to the wake side toward the tip portion 13 of the fin 12.

In this case, the second edge 122 may be longer than the third edge 123.

With the above embodiment, with the second edge 122 (an edge forming the leading edge 17 of the fin 12) disposed oblique to the fin height direction so as to get closer to the wake side toward the tip portion 13 of the fin 12, it is possible to generate a longitudinal vortex 37 (see FIG. 10) for promoting momentum exchange between inside and outside of the boundary layer 31 (see FIG. 6) at the wake side of the fin. Herein, the longitudinal vortex 37 is different from the longitudinal vortex 29 (see FIG. 6) formed by the lift F of the fin 12, and is generated by a flow flowing into the fin 12 along the second edge 122 extending from the upstream-most position of the leading edge 17 of the fin 12 toward the tip portion 13.

In some embodiments depicted in FIG. 11 as an example, the fin 12 further includes the fourth edge 124 of a linear shape or a curved shape forming a distal end, in the height direction, of the fin 12, in a side view.

In FIG. 7, the second edge 122 of the fin 12 is oblique with respect to the fin height direction so as to get closer to the wake side toward the tip portion 13 of the fin 12, and the fin 12 further includes the fourth edge 124 of a linear shape forming a distal end, in the height direction, of the fin 12, in a side view.

In another embodiment, although not depicted, the second edge 122 and the third edge may be disposed substantially parallel to each other, and the first edge 121 and the fourth edge 124 of the fin 12 may be disposed substantially parallel to each other, and thereby the fin 12 may have a substantially rectangular shape in a side view. In this case, the fin 12 can be produced readily.

As described above, a region in the vicinity of the tip portion 13 of the fin 12 has a relatively small importance with regard to aerodynamic character due to an influence of the longitudinal vortices 29 generated at the tip portion 13 of the fin 12. Thus, with the above embodiment, the tip portion 13 of the fin 12, which has less influence on aerodynamic performance of the entire fin, is cut off to form the fourth edge 124, and thereby it is possible to enhance safety of workers who handle the vortex generator and to reduce induced drag that may be generated at the fin.

In an embodiment, the first edge 121 and the third edge 123 form an angle α of 90 angular degrees.

In an embodiment, the chord length at the fourth edge 124 is 2 to 10% of the chord length at the fin root.

According to the above embodiment, with the chord length of the fourth edge 124 being 2 to 10% of the chord length at the root, it is possible to ensure the safety of workers during handling of the vortex generator 10, while maintaining the aerodynamic performance of the vortex generator 10.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A vortex generator for a wind turbine blade, comprising:
at least one fin including a suction surface and a pressure surface,
wherein each of the at least one fin is configured such that, in at least a part of a height range of said each of the at least one fin, a maximum camber ratio cmax/C being a ratio of a maximum camber cmax to a fin chord length C decreases with distance from a root of said each of the at least one fin toward a tip portion of said each of the at least one fin.

2. The vortex generator according to claim 1,
wherein each of the at least one fin is configured such that, provided that H is a height of said each of the at least one fin, in at least the part of the height range of not less than 0.5H, the maximum camber ratio cmax/C monotonically decreases with distance from the root toward the tip portion.

3. The vortex generator according to claim 1,
wherein, provided that H is a height of said each of the at least one fin and h is a position coordinate with respect to a height direction of said each of the at least one fin, a height position at which a change rate of the maximum camber ratio cmax/C with respect to h is at maximum is within the height range of not less than 0.7H and not more than 0.9H.

4. The vortex generator according to claim 1,
wherein said each of the at least one fin is configured such that an angle of a fin chord with reference to a wind inflow direction is not less than 12 degrees and not more than 18 degrees.

5. The vortex generator according to claim 1,
wherein said each of the at least one fin is configured such that L/H satisfies 2.0<L/H<4.0, provided that L/H is a ratio of a chord length L of a fin root to a height H of said each of the at least one fin.

6. The vortex generator according to claim 1,
wherein the pressure surface of said each of the at least one fin is formed by a flat surface at least in a part of a region where x/C is not less than 0.3, provided that x/C is a non-dimensional position with respect to a fin chordwise direction normalized by the fin chord length C, where x is a position coordinate along the fin chordwise direction.

7. The vortex generator according to claim 1,
wherein said each of the at least one fin is configured such that, in the height range of not less than 0.5H and not more than 0.85H, where H is a height of said each of the at least one fin, a maximum blade thickness ratio tmax/C satisfies 0.10<tmax/C<0.12, provided that the maximum blade thickness ratio tmax/C is a ratio of a fin maximum blade thickness tmax to the fin chord length C.

8. The vortex generator according to claim 1,
wherein, in a side view, said each of the at least one fin includes:
a first edge forming a connection portion between said each of the at least one fin and a surface of the wind turbine blade;
a second edge intersecting with the first edge, being positioned upstream of the first edge with respect to a wind inflow direction, and forming an upstream end portion of said each of the at least one fin; and
a third edge intersecting with the first edge, being positioned downstream of the second edge with respect to the wind inflow direction, and forming a downstream end portion of said each of the at least one fin.

9. The vortex generator according to claim 8,
wherein, in said each of the at least one fin, the second edge is oblique with respect to a fin height direction so as to extend toward a wake side with distance toward the tip portion of said each of the at least one fin.

10. The vortex generator according to claim 8,
wherein the first edge and the third edge form an angle of 90 degrees.

11. The vortex generator according to claim 8,
wherein, in the side view, said each of the at least one fin further includes a fourth edge having a linear shape or a curved shape, the fourth edge forming a tip in a height direction of said each of the at least one fin.

12. The vortex generator according to claim 11,
wherein a chord length at the fourth edge is 2 to 10% of the chord length at the root.

13. The vortex generator according to claim 1,
further comprising a platform portion to be mounted to a surface of the wind turbine blade, the platform portion having a front surface on which said each of the at least one fin is to be erected and a flat bottom surface disposed opposite to the front surface,
wherein the platform portion has a curved convex cross-sectional shape at least along a blade spanwise direction of the wind turbine blade.

14. The vortex generator according to claim 1,
wherein the at least one fin includes a plurality of fins which forms a plurality of fin sets each including a pair of fins arranged so that the suction surfaces face each other, and a ratio S/H of a spanwise distance S between trailing edges of the pair of fins to a height H of each of the pair of fins satisfies 2.5<S/H<4.0.

15. A wind turbine blade assembly, comprising:
a wind turbine blade; and
the vortex generator according to claim 1 mounted to a surface of the wind turbine blade.

* * * * *